(12) United States Patent
Liu

(10) Patent No.: US 7,987,503 B2
(45) Date of Patent: Jul. 26, 2011

(54) FIREWALL CONTROL SYSTEM BASED ON A NEXT GENERATION NETWORK SERVICE AND METHOD THEREOF

(75) Inventor: Enhui Liu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1113 days.

(21) Appl. No.: 11/785,991

(22) Filed: Apr. 23, 2007

(65) Prior Publication Data

US 2007/0234414 A1 Oct. 4, 2007

Related U.S. Application Data

(63) Continuation of application No. PCT/CN2006/001141, filed on May 29, 2006.

(30) Foreign Application Priority Data

Jul. 30, 2005 (CN) .......................... 2005 1 0085721

(51) Int. Cl.
*G06F 9/00* (2006.01)
(52) U.S. Cl. ...................................................... 726/11
(58) Field of Classification Search ................ 726/1, 11, 726/12, 13, 14; 713/150, 151, 153; 709/224, 709/225
See application file for complete search history.

(56) References Cited

U.S. PATENT DOCUMENTS

| | | | |
|---|---|---|---|
| 7,260,840 B2 * | 8/2007 | Swander et al. | 726/13 |
| 2004/0034793 A1 | 2/2004 | Yuan | |
| 2004/0268150 A1 | 12/2004 | Aaron | |
| 2005/0022011 A1 | 1/2005 | Swander et al. | |
| 2005/0235349 A1 * | 10/2005 | Boyle et al. | 726/11 |

FOREIGN PATENT DOCUMENTS

| | | |
|---|---|---|
| CN | 1555170 A | 12/2004 |
| CN | 1574792 | 2/2005 |

(Continued)

OTHER PUBLICATIONS

Srisuresh Kuokoa Networks J Kuthan Fraunhofer Institute Fokus J Rosenberg Dynamicsoft A Molitor Aravox Technologies A Rayhan Ryers: "Middlebox communication architecture and framework; rfc3303.txt" IETF Standard, Internet Engineering Task Force, IETF, CH, Aug. 2002, pp. 1-34, XP015009080 ISSN: 0000-0003 *paragraphs [Abstract]—[003.]*.

(Continued)

*Primary Examiner* — Beemnet Dada
(74) *Attorney, Agent, or Firm* — Slater & Matsil, L.L.P.

(57) ABSTRACT

The invention provides a firewall control system based on a Next Generation Network (NGN) service and a method thereof. The method includes: resolving an application layer signaling, performing a security inspection of a signaling flow and determining requirements of a service media flow on security level; determining controlment of the service media flow on security level according to a stored policy and the requirements of the service media flow on security level; performing a security inspection of the service media flow passing by, according to the controlling information of the service media flow on security level. In embodiments of the invention, a Packet-filter-based Firewall is enabled to perform a fine granularity security hierarchy processing of each subscriber and each session in the NGN, and dynamically select working mode of firewall packet filtering of different security levels according to a subscriber requirement and a session type to prevent network attacks.

14 Claims, 2 Drawing Sheets

FOREIGN PATENT DOCUMENTS

CN  1192310 C  3/2005

OTHER PUBLICATIONS

"Tispan NGN Security Security Architecture-NGN Release 1; Draft ETSI TS 187003" ETSI Standards, European Telecommunications Standards Institute, Sophia-Antipo, FR, No. V 2, 2005, pp. 1-84; XP014028890 ISSN: 0000-0001 *paragraphs [004.]—[4.1.2.] * *paragraphs [A.1.4.]—[A.2.1.1.]*.

Yavatkar, R., et al., "A Framework for Policy-based Admission Control," Internet Engineering Task Force, Network Working Group, Request for Comments: 2753 (rfc2753), Category: Informational, Jan. 2000, 18 pages, The Internet Society.

"3rd Generation Partnership Project; Technical Specification Group Core Network; Policy control over Go interface (Release 6)," 3GPP TS 29.207 v6.1.0, Sep. 2004, 59 pages, 3GPP Organizational Partners. Itu, "Revision 1 of Tr-Racs," International Telecommunication Union, Telecommunication Standardization.

ITU, "Revision 1 of TR-RACS," International Telecommunication Union, Telecommunication Standardization Sector, WG3, Output Document, Focus Group on Next Generation Networks (FGNGN-OD-00074), Nov. 30-Dec. 3, 2004, 22 pages, Geneva.

ETSI, "NGN Functional Architecture; Resource and Admission Control Subsystem (RACS); Release 1," Draft ETSI ES 2XX XXX v<1.2.1>, 06TD051, Reference: >DES/TISPAN-02020-eNGN, Mar. 2005, 22 pages.

International Search Report, International Application No. PCT/CN2006/001141, Date of mailing: Aug. 31, 2006, 4 pages.

Written Opinion of the International Searching Authority, International Application No. PCT/CN2006/001141, Applicant: Huawei Technologies Co., Ltd., et al., Date of mailing: Aug. 31, 2006, 6 pages.

European Office Action, European Application No. 06 742 029.9-2413, Applicant: Huawei Technologies Co., Ltd., Dated: Apr. 17, 2008, 5 pages.

European Office Action, European Application No. 06 742 029.9-2413, Applicant: Huawei Technologies Co., Ltd., Dated: Oct. 15, 2008, 3 pages.

\* cited by examiner

FIREWALL CONTROL SYSTEM BASED ON A NEXT GENERATION NETWORK SERVICE AND METHOD THEREOF

CROSS-REFERENCE TO RELATED APPLICATIONS

This is a continuation of International Application No. PCT/CN2006/001141, filed on May 29, 2006, now published as WO 2007/014507, published date Feb. 8, 2007, which designated the United States; the disclosure of which is hereby incorporated by reference in its entirety.

FIELD OF THE TECHNOLOGY

The present invention relates to network communication technologies, and particularly, to a firewall control system based on a Next Generation Network (NGN) service and a method thereof.

BACKGROUND OF THE INVENTION

In an NGN network, a service layer is separated from a transport layer. The transport layer is based on packet technologies and optical technologies while the service layer provides many kinds of multimedia services. Much attention will be paid as how to guarantee security and Quality of Service (QoS) of a service in an NGN network since an NGN network is based on Internet Protocol (IP) packet technologies. Moreover, a firewall function, which is the most important and used most widely network security technology, will still be used for solving the security problem of services in an NGN.

At present, firewall products are mainly categorized into two species, that is, Packet-filter-based Firewall and Application-proxy-based Firewall. The Packet-filter-based Firewall operates in the transport layer while the Application-proxy-based Firewall operates in the application layer.

The Packet-filter-based Firewall further includes the following four working modes.

(1) Static Packet Filtering Firewall

A Static packet filtering firewall implements a static packet filtering based on information of a data packet head. The Static packet filtering firewall makes a decision of admission or rejection of each data packet received. The Static packet filtering firewall examines each data packet so as to determine whether the packet matches a certain filtering rule. The filtering rule is based on information of a packet head that may be provided to an IP forwarding process. The following contents of a packet head are mainly to be examined in the packet filtering process: an IP source address, an IP destination address, type of protocol (a Transmission Control Protocol (TCP) packet, a User Datagram Protocol (UDP) packet or an Internet Control Message Protocol (ICMP) packet), a destination port of a TCP or UDP packet, a source port of a TCP or UDP packet, type of an ICMP message, an ACK bit of a TCP packet head.

The Static packet filtering firewall has the following disadvantages: it is hard to maintain a Static packet filtering firewall; the Static packet filtering firewall cannot prevent a spoofing attack of a hacker effectively; the Static packet filtering firewall does not support filtering in the application layer and cannot prevent a data-driven attack; and the Static packet filtering firewall cannot provide a comprehensive control of an information flowing in the network. Therefore, security of the Static packet filter is poor.

(2) Dynamic Packet Filtering Firewall

A method of setting a packet filtering rule dynamically is adopted to avoid the problems in the Static packet filtering. In the Dynamic packet filtering, a port is opened only when a user sends a request and is closed after the service is committed. Thus, the possibility of suffering attacks related to an open port is decreased. The Dynamic packet filtering firewall can dynamically determine which data packets are allowed to pass links of an internal network and can dynamically obtain services of the application layer. And the Dynamic packet filtering firewall can configure a corresponding access policy, that is, a port is automatically open only within an allowed range and closed when the communication ends.

The Dynamic packet filtering firewall minimizes number of exposed ports in both directions and thus, provides better security to a network. The Dynamic IP packet filtering provides the most secure method for allocating ports dynamically to many application protocols, such as a media flow.

(3) Stateful Inspection

When performing a packet filtering, a Stateful Inspection firewall checks relevancy between/among data packets as well as state codes changing dynamically in the data packets. The Stateful Inspection firewall has an inspection engine which inspects each layer carrying out a network communication through a method of extracting related data. The inspection engine extracts state information and dynamically stores the state information as a reference for performing a security policy in the future. When a user access request reaches the operating system of a gateway, a state monitor extracts and analyses related data, and performs a processing action, such as admitting, rejecting, IDentification (ID) authentication, alarming or encrypting the communication, in combination with the network configuration and the security rules.

The Stateful Inspection firewall reserves a connection state table, regards data entering and leaving the network as sessions and uses the connection state table to track the state of each session. The state monitor checks each packet not only according to a rule table, but also considering whether the packet is in conformity with the state of the session. Thus, a comprehensive control of the transport layer is achieved. The mainstream firewalls in the market nowadays are Stateful Inspection firewalls in general. Although security of the Stateful Inspection firewall is improved to a certain extent, the Stateful Inspection firewall is not so satisfying in dealing with a Distributed Denial of Service (DDoS) attack, filtering of contents in the application layer and filtering of viruses.

(4) Deep Packet Inspection

The Deep Packet Inspection technology is combined with functions of invade detection and attack preventing. The Deep Packet Inspection technology can in-depth inspect a flow of information packets to find a vicious action and can search a known attack according to a feature detection and a content filtering. Moreover, the Deep Packet Inspection can identify what is "normal" communication and stops an abnormal access at the same time. A Deep Packet Inspection engine determines how to deal with a data packet based on technologies, such as a fingerprint matching, a heuristic technology, a malfunction detection and a statistical analysis. A Deep Packet Inspection firewall can effectively stop a DDoS attack, solve the problem of virus spread and the problem of advanced application invade.

Till now, the Application-proxy-based Firewall has also passed the evolvement from an Application Proxy firewall, a Circuit Proxy firewall to an Adaptation Proxy firewall.

The Application Proxy is also referred to as an Application Gateway. A proxy service is a dedicated application programme or a server programme running in a firewall host. The Application Proxy provides proxy to a special application service, resolves an application protocol and interprets commands of the application protocol.

The Application Proxy firewall can interpret an application protocol, support a subscriber authentication, and thus, can control data of the application layer with a finer granularity. The disadvantage of the Application Proxy firewall is that the efficiency is too low, no large scale concurrent connections can be supported, and only a single protocol is applicable.

The Application-proxy-based Firewall and the Packet-filter-based Firewall have been used widely in network security solutions. The Application-proxy-based Firewall and the Packet-filter-based Firewall may exist at the same time and filter data packets transmitted in the network in two layers, respectively.

In the NGN security solution and in a resource and admittance control framework being studied, only the Dynamic packet filtering can accept an open/close request from a session control proxy, that is, a Service Control Proxy Function (SCPF) controls open and close of the Dynamic packet filtering in a Border Gateway Function (BGF) through a Resource and Admittance Control Function (RACF), which is similar to the control and interaction between a proxy and a packet filtering in an Adaptation Proxy firewall device.

However, setting of the Static packet filtering, the Stateful Inspection and the Deep Packet Inspection in the NGN transport layer is performed by an administrator and can only be dealt with according to a coarse granularity security hierarchy configured by an operating policy. Moreover, the setting is invisible to the NGN service layer (including a session control proxy). In the case that a firewall provides packet filtering functions of different security levels, such as the static packet filtering, the dynamic packet filtering, the Stateful Inspection and the Deep Packet Inspection, at the same time, the firewall cannot dynamically select and execute a packet filtering function of different security levels according to a subscriber demand and a session type.

SUMMARY OF THE INVENTION

Embodiments of the present invention provide a firewall control system based on a Next Generation Network (NGN) service, which enables a Packet-filter-based Firewall to execute a fine granularity security hierarchy processing of each subscriber and each session.

Embodiments of the present invention also provide a firewall control method based on an NGN service.

A firewall control system based on an NGN service, including:

an Application Proxy module, for resolving an application layer signalling, performing a security inspection of a signalling flow, determining requirements of a service media flow on security level;

a Policy Decision Functional entity (PDF), for determining controlment of the service media flow on security level, according to a stored policy and the requirements of the service media flow on security level provided by the Application Proxy module;

a firewall function module, for performing a security inspection of the service media flow passing by, according to the controlment of the service media flow on security level control provided by the PDF.

A firewall control method based on an NGN service, includes the following processes:

resolving an application layer signalling;
performing a security inspection of a signalling flow;
determining requirements of a service media flow on security level;
determining controlment of the service media flow on security level according to a stored policy and the requirements of the service media flow on security level;
performing a security inspection of the service media flow passing by, according to the controlment of the service media flow on security level.

As can be seen from the above technical solutions provided by embodiments of the present invention, a Packet-filter-based Firewall is enabled to perform a fine granularity security hierarchy processing of each subscriber and each session in the NGN, and dynamically select working mode of packet filtering of different security levels according to a subscriber requirement and a session type, so as to prevent network attacks, such as a resource embezzling, an IP address masquerade, a Denial of Service and an advanced application invade, by cooperation of the session control proxy function in the service layer and the Packet-filter-based firewall function in the transport layer.

Moreover, in embodiments of the present invention, requirement information of service security level and controlling information of network security level may be defined independently and mapped by the PDF according to the policy rules, which implements the feature of separation between the service layer and the transport layer in the NGN.

In addition, in embodiments of the present invention, the Application-proxy-based Firewall function and the Packet-filter-based Firewall function are located in the SCF and the BGF, respectively, their respective technology evolvement and function enhancement are performed independently and will not affect each other, and they can cooperate with each other only if the policy rules in the PDF are revised.

EMBODIMENTS OF THE INVENTION

In order to make the objective, technical solution and advantages of embodiments of the present invention clearer, a detailed description of the present invention is hereinafter given with reference to the drawings and detailed embodiments.

A session control proxy function is a necessary component in a system architecture of the service layer in the NGN. For example, a Proxy Call Session Control Function (P-CSCF) in an Internet Protocol Multimedia Subsystem (IMS), which is the first contact point of a multimedia session service, and is an application proxy in nature. The P-CSCF performs a subscriber authentication, an application protocol resolving and proxy, as well as a Network Address and Port Translation (NAPT) in the application layer. A Packet-filter-based Firewall function is a necessary security component in the system architecture of the transport layer in the NGN, includes functions of the static packet filtering, the dynamic packet filtering, the Stateful Inspection and the Deep Packet Inspection, and in general, is set at the border of a network to protect the inner components against attack.

Therefore, embodiments of the present invention provide a dynamic firewall control system as well as a method supporting security hierarchy of services in the NGN. By the cooperation of the session control proxy function in the service layer and the Packet-filter-based Firewall function in the transport layer, the Packet-filter-based Firewall is enabled to perform a fine granularity security hierarchy processing of each subscriber and each session in the NGN, and dynamically select working mode of packet filtering of different security levels, such as the dynamic packet filtering, the Stateful Inspection or the Deep Packet Inspection, according to a subscriber requirement and a session type. The Packet-filter-based Firewall which can dynamically select working mode of packet filtering of different security levels, can prevent network attacks, such as a resource embezzling, an IP address masquerade, a Denial of Service and an advanced application invade.

Embodiments of the present invention provide a dynamic firewall control system as well as a method supporting security hierarchy of services in the NGN. The system and method provided by embodiments of the present invention may be applied independently as a security solution of services in the NGN, and may also be integrated into a resource and admittance control framework in the NGN as a synthetic solution to improve Quality of Service (QoS) of transport, security and NAPT traversal of services in the NGN.

Figure 1:
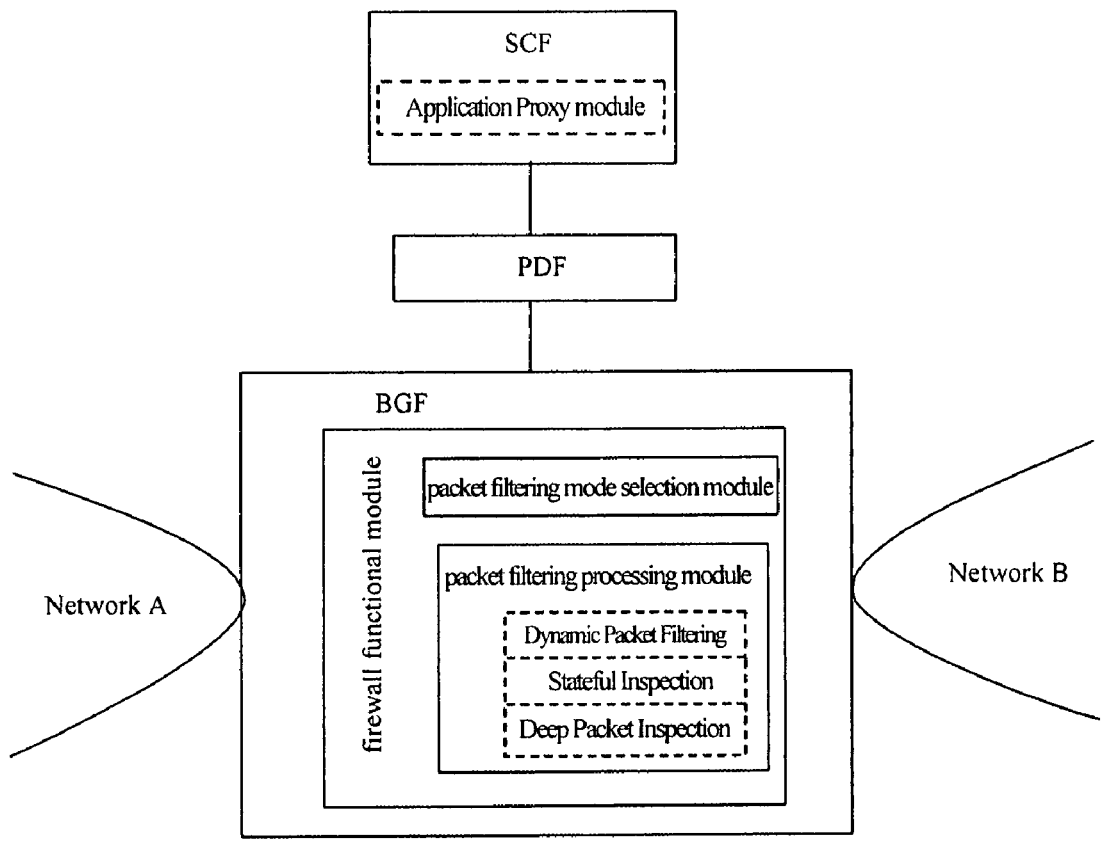
FIG. 1 shows a schematic diagram illustrating an exemplary structure of a dynamic firewall control system in accordance with an embodiment of the present invention.

An exemplary structure block of the dynamic firewall control system in accordance with an embodiment of the present invention is shown in FIG. 1 and the system includes the following components.

(1) An Application Proxy module including an Application-proxy-based Firewall function, preferably located in a Service Control Function (SCF), and used for resolving an application layer signalling, performing a security inspection of a signalling flow, determining requirement information of a service media flow on security level and providing the requirement information to a Policy Decision Functional entity (PDF).

The SCF device may be: a P-CSCF device in an IMS of the NGN, a Call Agent device in a Softswitch system of the NGN, or an SCF including an Application Proxy function in other service systems in the NGN.

(2) a PDF is used for mapping the requirement information of a service media flow on security level to the controlling information of the media flow on security level, and providing the controlling information to a Packet-filter-based Firewall functional module in a BGF.

The PDF may be an independent device, and also may be a functional module integrated into an SCF or a BGF.

(3) A firewall functional module configured in a BGF, is used for performing a security inspection of a service media flow passing by the device based on packet filtering and according to the controlling information of the media flow on security level. The module specifically includes the following components.

A packet filtering mode selection module, which is used for determining working mode of a Packet-filter-based Firewall for performing a security inspection of the service media flow, according to the controlling information of the media flow on security level provided by the PDF, and initiating the corresponding Packet-filter-based Firewall processing function in a corresponding packet filtering processing module.

A packet filtering processing module includes configured firewall functions of various working mode of Packet-filter-based Firewall. The configured firewall functions are initiated under the control of the packet filtering mode selection module and used for performing a security inspection of a corresponding service media flow.

The working mode of Packet-filter-based Firewall includes: the dynamic packet filtering, the Stateful Inspection and the Deep Packet Inspection.

Figure 2:
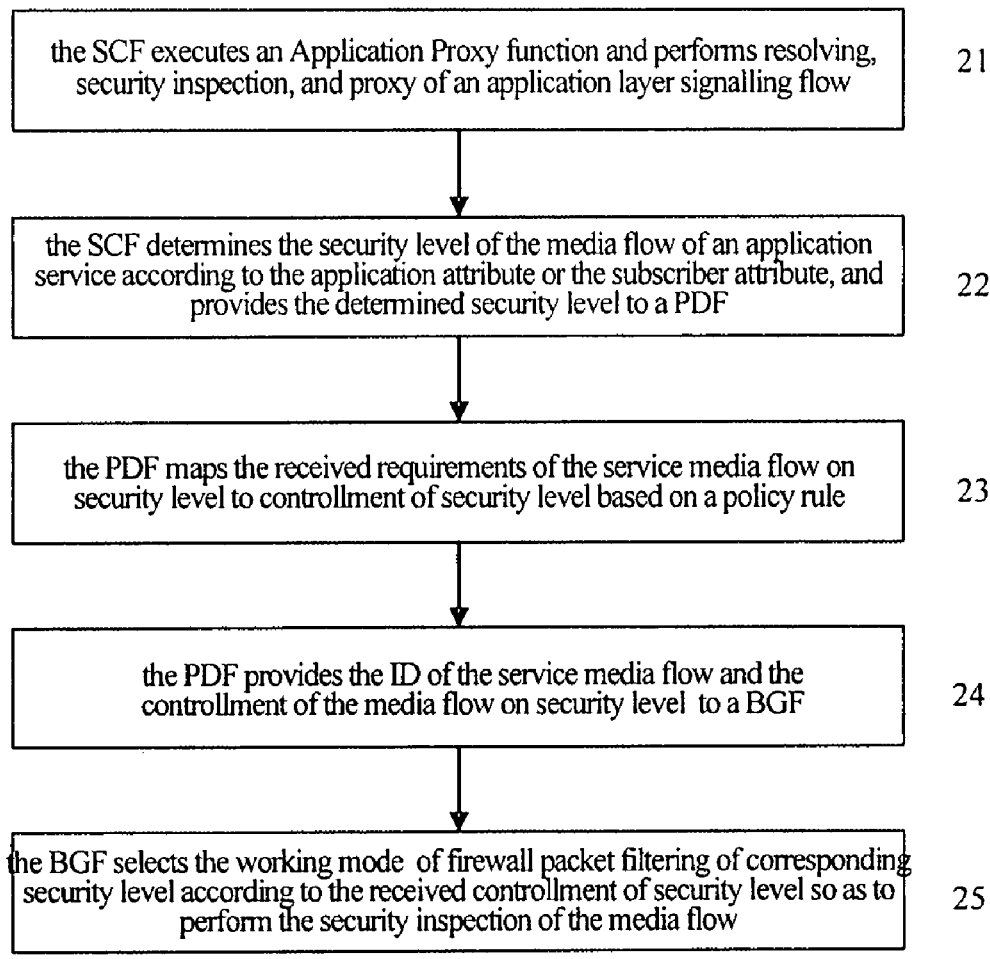
FIG. 2 shows an exemplary flow chart for implementing a dynamic firewall control method in accordance with an embodiment of the present invention.

Based on the above dynamic firewall control system, the detail implementation of the method in accordance with an embodiment of the present invention is shown in FIG. 2 and the method specifically includes the following steps.

Step 21: an SCF executes an Application Proxy function and performs resolving, security inspection and proxy of an application layer signalling, that is, implements the firewall technology based on an application proxy. The Application-proxy-based Firewall function may be included in an "Application Proxy" functional module. And the firewall function supports a subscriber authentication, performs a security inspection and an access authentication processing of an accessing subscriber.

Step 22: the SCF determines the security level of the media flow of an application service according to an application attribute or a subscriber attribute, provides the ID information of the service media flow and the requirement information of the service on security level to a PDF.

The application attribute or subscriber attribute includes a service type (a voice flow may have a higher requirement on security level than a video flow does) and a requirement on security level preconcerted by a subscriber to an operator (e.g. requirement on security level of an enterprise subscriber is higher), etc.; the corresponding application attribute or subscriber attribute may be stored in a subscriber database or a service database, and may also be coarse classification information configured in an SCF, which are determined by a commercial operating mode, and it is difficult to standardize them or protect them with a patent.

Other requirement information, such as QoS, priority, may also be provided to the PDF together if necessary.

Step 23: the PDF maps the received requirement information of the service media flow on security level to the controlling information of the media flow on security level based on policy rules.

Specifically speaking, the policy rules may be determined by an operator according to the device deployment and the commercial operating mode.

Step 24: the PDF provides the ID information of the service media flow and the controlling information of the media flow on security level to a BGF, so as to control the Packet-filter-based Firewall function in the BGF. Other information, such as QoS, NAPT control information, may be provided together to the BGF by the PDF according to an application requirement.

Step 25: the BGF selects working mode of Packet-filter-based Firewall with corresponding security level, such as the dynamic packet filtering, the Stateful Inspection or the Deep Packet Inspection, according to the received controlling information of the media flow on security level, and executes the firewall function for the service media flow based on packet filtering, so as to prevent network attacks, such as a resource embezzling, an IP address masquerade, a Denial of Service and an advanced application invade.

To sum up, in embodiments of the present invention, a Packet-filter-based Firewall is enabled to perform a fine granularity security hierarchy processing of each subscriber and each session in the NGN, and dynamically select working mode of Packet-filter-based Firewall with different security levels according to a subscriber requirement and a session type, so as to prevent network attacks, such as a resource embezzling, an IP address masquerade, a Denial of Service and an advanced application invade, by the cooperation of the session control proxy function in the service layer and the Packet-filter-based Firewall function in the transport layer.

The foregoing descriptions are only preferred embodiments of the present invention. The protection scope of the present invention, however, is not limited to the above descriptions. Any change or substitution, within the technical scope disclosed by embodiments of the present invention, easily occurring to those skilled in the art should be covered by the protection scope of the present invention. Therefore, the protection scope of the present invention should be according to the claims.

The invention claimed is:

1. A firewall control system based on a Next Generation Network (NGN) service, the system comprising:
an Application Proxy module including an Application-proxy-based Firewall function located in an NGN Service Control Function (SCF) device, for resolving an application layer signalling, performing a security inspection of a signalling flow, and determining requirements of a service media flow on security level;
a Policy Decision Functional entity (PDF), for mapping the requirements of the service media flow on security level to controlment of the service media flow on security level, according to a stored policy and the requirements of the service media flow on security level provided by the Application Proxy module; and
a firewall function module configured in a Border Gateway Function (BGF) device, for performing a security inspection of the service media flow passing by, according to the controlment of the service media flow on security level control provided by the PDF;
wherein the firewall function module comprises:
a packet filtering mode selection module, for determining a working mode of firewall packet filtering for a security inspection of the service media flow, according to the controlment of the media flow on security level provided by the PDF; and
a packet filtering processing module including configured firewall functions with various working modes of firewall packet filtering, wherein the configured firewall functions are initiated under the control of the packet filtering mode selection module and used for performing a security inspection of a corresponding service; and
wherein the packet filtering mode selection module is further used for initiating a corresponding Packet-filter-based Firewall processing function in a corresponding packet filtering processing module.

2. The system of claim 1, wherein the SCF comprises:
a Proxy Call Session Control Function (P-CSCF) in an Internet Protocol Multimedia Subsystem (IMS) in the NGN.

3. The system of claim 1, wherein the PDF is set in the SCF.

4. The system of claim 1, wherein the working mode of firewall packet filtering configured by the packet filtering processing module comprises:
a dynamic packet filtering, a Stateful Inspection and a Deep Packet Filter.

5. A firewall control method based on a Next Generation Network (NGN) service, the method comprising:
resolving, by an Application Proxy module in a Service Control Function (SCF) device, an application layer signalling;
performing, by the Application Proxy module in the SCF device, a security inspection of a signalling flow;
determining, by the Application Proxy module in the SCF device, requirements of a service media flow on security level;
mapping, by a Policy Decision Function (PDF) device, the requirements of the service media flow on security level to controlment of the service media flow on security level according to a stored policy and the requirements of the service media flow on security level provided by the Application Proxy Module; and
performing, by a Border Gateway Function (BGF) device, a security inspection of the service media flow passing by, according to the controlment of the service media flow on security level provided by the PDF device;
wherein performing a security inspection of the service media flow passing by comprises:
determining a working mode of firewall packet filtering for the security inspection of the service media flow passing by, according to the controlment of the service media flow on security level; and
performing the security inspection of the service media flow passing by, according to the determined working mode of the firewall packet filtering.

6. The method of claim 5, wherein determining requirements of a service media flow on security level comprises determining requirements based on an application attribute.

7. The method of claim 5, wherein performing a security inspection of the service media flow passing by comprises:
determining working mode of firewall packet filtering for the security inspection of the service media flow passing by, according to the controlment of the service media flow on security level; and
performing the security inspection of the service media flow passing by, according to the determined working mode of the firewall packet filtering.

8. The method of claim 7, wherein the working mode of firewall packet filtering comprises:
a dynamic packet filtering, a Stateful Inspection and a Deep Packet Filter.

9. The method of claim 5, wherein the working mode of firewall packet filtering comprises:
a dynamic packet filtering, a Stateful Inspection and a Deep Packet Filter.

10. The system of claim 1, wherein the SCF comprises a Call Agent device in a Softswitch system in the NGN.

11. The system of claim 1, wherein the SCF comprises an SCF including an Application Proxy function in other service system(s) in the NGN.

12. The system of claim 1, wherein the PDF is set in the BGF.

13. The system of claim 1, wherein the PDF is set to an independent device.

14. The method of claim 5, wherein determining requirements of a service media flow on security level comprises determining requirements based on a subscriber attribute.

* * * * *